Sept. 2, 1930.  F. MEYER  1,774,560
SODIUM SULPHIDE DROPS AND METHOD FOR MAKING THEM
Filed March 25, 1925
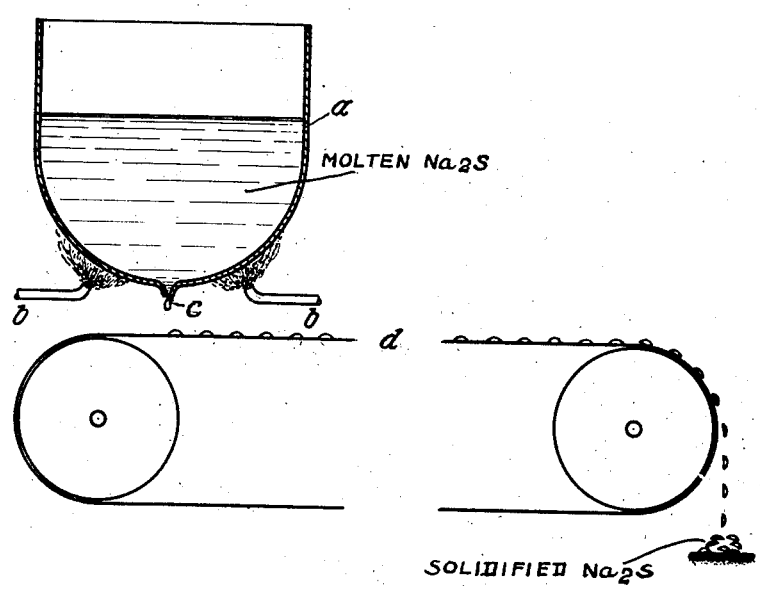

Patented Sept. 2, 1930

1,774,560

UNITED STATES PATENT OFFICE

FRIEDRICH MEYER, OF BERLIN-BAUMSCHULENWEG, GERMANY, ASSIGNOR TO CHEMISCHE FABRIKEN KUNHEIM & CO. AKTIENGESELLSCHAFT, OF BERLIN-NIEDERSCHONEWEIDE, GERMANY

SODIUM SULPHIDE DROPS AND METHOD FOR MAKING THEM

Application filed March 25, 1925, Serial No. 18,315, and in Germany May 1, 1924.

The present invention refers to a stable physical form for chemicals and the method of making the same.

Heretofore, inorganic compounds such as caustic alkalies, sodium sulphide, and sodium bisulfate, and organic compounds such as paraffin, camphor, resins, albumins, glue, dextrine, etc., have been produced commercially in the form of blocks, plates, or irregular pieces. In contrast to these prior forms, the new form of such chemicals contemplated in the present invention consists of solidified drops having a predetermined size or weight controlled by the size of the molten drops from which solidified drops are formed.

The process for making this new form of chemicals consists in melting the chemical, for instance sodium sulphide, by heating it to a sufficiently high temperature and then causing the molten chemical in the form of natural drops to fall from an appropriate orifice to impact upon a plate arranged at a suitable distance below the outlet orifice and having a temperature below the melting point of the chemical. The drops may also be formed by interrupting a falling jet of the molten chemical. The molten drops are solidified by the cooler plate, whereby they assume the shape of hemispheres or flattened round disks. The shape of the drops may be controlled by varying the height from which the drops fall, the temperature of the molten chemical, and the temperature of the plate. If the drops fall a sufficiently long distance they will be flattened; whereas if the temperature of the drops and the plate are nearly the same, and the drops fall through a short distance they will assume a solidified shape of hemispherical nature. Likewise, if molten drops having a high temperature fall upon a plate having a temperature but little below the melting point of the chemical, the solidified drops will be more flattened than if the temperature of the molten drop and plate were lower.

In the accompanying drawing $a$ is a vessel containing the molten mass; $b$ is a suitable heating means; $c$ is an orifice through which the molten mass drops; $d$ is a solid plate-like surface. The molten liquid heated by $b$ falls in the form of drops through the orifice $c$ and impacts upon the plate $d$.

In order to illustrate the manner of carrying out the present process I give the following example. Liquefied sodium sulphide having a temperature 80° C. to 100° C. is allowed to fall from an orifice of 7 millimeters diameter, controlled by a valve of suitable shape, for instance, a conical valve. The molten drops fall on an iron plate having a temperature of from 20° C. to 50° C.

The plate on which the chemicals fall may consist of any material which is resistant to chemical action with the drops at the temperatures involved. Suitable materials are metals such as iron, steel, copper, brass, or such materials as ebonite, marble, glass, porcelain, galolithe, acetyletic cellulose, and hardened phenolformaldehyde condensation products. Fixed plates, moving plates, endless bands, revolving drums, etc., may be employed. In order to prevent the drops from adhereing to the plates, the plates may be coated with a thin layer of substances to which the drops do not adhere. For example, layers of vegetable, animal, or mineral oils may be used in forming drops of inorganic chemicals. In forming drops of organic substances, the films may consist of water or hard paraffin.

The process may also be utilized for treating inorganic or organic compounds containing water of crystallization and which are only partially in the liquid state. For example, the present process may be applied for treating the mixtures obtained by evaporating sodium sulphide and similar solutions to partial crystallization. Such a mixture consists partially of separated sodium sulphide having a low water content and partially of sodium sulphide having a large amount of water of crystallization. Hence, when I refer to a molten substance or compound in the claims, it is to be understood that this covers a molten substance having nonmolten ingredients.

This process may also be applied to molten materials having non-molten substances suspended therein, such as carbon, chalk, coloring materials, etc.

It will be noted that each drop has a flat surface formed by its impact upon the collecting surface. However, this impact is not so violent as to cause the drop to disintegrate, so that the contour of the remainder of the drop is determined by gradual solidification. If the drops were allowed to cool to the solidification point before falling on the collecting surface they would roll off the collecting surface, and this would cause the drops to chip more or less, so that uniform drops would not be secured.

Likewise, the drops have a substantially smooth periphery, because the liquid drops are allowed to fall through the air so as to gradually cool and to assume and maintain a shape determined by the surface tension of the molten material. On the contrary, solid bodies produced by causing liquid masses to fall into a pool of water or other liquid usually have rough peripheries because they are suddenly cooled.

I claim:—

1. A process for making solidified drops of a mixture of crystalline sodium sulphide and sodium sulphide plus water of crystallization, which consists in causing drops of a predetermined size of a mixture containing crystalline sodium sulphide suspended in a melt of sodium sulphide plus water of crystallization to fall, while in a molten state, through a zone free from liquid, and to impact against a solid cooling member.

2. As a new article of manufacture, solidified drops of a mixture of crystalline sodium sulphide and sodium sulphide plus water of crystallization, said drops having a bottom surface which is flattened relatively to the rounded remainder of the drop, and having a smooth, regular surface which is difficult to crack, abrade, chip, or otherwise disintegrate under handling conditions, said drop being highly resistent to oxidation and atmospheric action.

In testimony whereof I hereunto affix my signature.

Dr. FRIEDRICH MEYER.